US012535571B2

(12) United States Patent
Liang

(10) Patent No.: US 12,535,571 B2
(45) Date of Patent: Jan. 27, 2026

(54) VEHICLE POSITIONING METHOD, ON-VEHICLE DEVICE, ROADSIDE DEVICE, AND MEDIUM

(71) Applicant: PATEO CONNECT+ Technology (Shanghai) Corporation, Shanghai (CN)

(72) Inventor: Chen Liang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 103 days.

(21) Appl. No.: 18/592,894

(22) Filed: Mar. 1, 2024

(65) Prior Publication Data

US 2024/0248190 A1    Jul. 25, 2024

Related U.S. Application Data

(63) Continuation of application No. PCT/CN2022/073760, filed on Jan. 25, 2022.

(30) Foreign Application Priority Data

Sep. 3, 2021 (CN) .......................... 202111032924.6

(51) Int. Cl.
*G01S 13/08* (2006.01)
*G01S 13/02* (2006.01)
(52) U.S. Cl.
CPC .......... *G01S 13/08* (2013.01); *G01S 13/0209* (2013.01)
(58) Field of Classification Search
None
See application file for complete search history.

(56) References Cited

U.S. PATENT DOCUMENTS

| 7,610,146 B2* | 10/2009 | Breed ................... G01C 21/28 |
| | | 701/300 |
| 2010/0076682 A1* | 3/2010 | Yamada ................ G08G 1/167 |
| | | 701/300 |

(Continued)

FOREIGN PATENT DOCUMENTS

| CN | 108898880 A | 11/2018 |
| CN | 110018503 A | 7/2019 |

(Continued)

OTHER PUBLICATIONS

The World Intellectual Property Organization (WIPO) International Search Report for PCT/CN2022/073760 May 17, 2022 7 Pages (including translation).

*Primary Examiner* — Daniel L Greene
(74) *Attorney, Agent, or Firm* — ANOVA LAW GROUP, PLLC

(57) ABSTRACT

A vehicle positioning method includes determining a first relative horizontal distance between an onboard device and a roadside device at a first moment, a second relative horizontal distance at a second moment, and a third relative horizontal distance at a third moment, obtaining position information of the roadside device, determining a first moving distance of a vehicle where the onboard device is located from the first moment to the second moment and a second moving distance of the vehicle from the second moment to the third moment, and based on the first moving distance and the second moving distance, determining a moving trajectory of the vehicle partially overlapping with three circles with the position information of the roadside device as a center and with the first relative horizontal distance, the second relative horizontal distance, and the third relative horizontal distance as radii.

20 Claims, 11 Drawing Sheets

(56) References Cited

U.S. PATENT DOCUMENTS

| | | | |
|---|---|---|---|
| 2021/0231461 A1* | 7/2021 | Wang | G01S 5/0269 |
| 2022/0105926 A1* | 4/2022 | Zhang | G08G 1/162 |
| 2024/0177597 A1* | 5/2024 | Hua | G08G 1/0133 |

FOREIGN PATENT DOCUMENTS

| | | |
|---|---|---|
| CN | 110673092 A | 1/2020 |
| CN | 111681445 A | 9/2020 |
| CN | 112050819 A | 12/2020 |
| CN | 113747354 A | 12/2021 |
| EP | 3096154 A1 | 11/2016 |
| EP | 3825714 A2 | 5/2021 |
| GB | 2450476 A | 12/2008 |
| KR | 20210065075 A | 6/2021 |

\* cited by examiner

VEHICLE POSITIONING METHOD, ON-VEHICLE DEVICE, ROADSIDE DEVICE, AND MEDIUM

CROSS-REFERENCE TO RELATED APPLICATION

The present disclosure is a continuation of International Application No. PCT/CN2022/073760, filed on Jan. 25, 2022, which claims priority to Chinese Patent Application No. 202111032924.6, filed on Sep. 3, 2021, the entire contents of both of which are incorporated herein by reference.

TECHNICAL FIELD

The present disclosure relates to the information processing field and, more particularly, to a vehicle positioning method, an on-vehicle device, a roadside device, and a computer storage medium.

BACKGROUND

As new technologies, such as smart transportation, autonomous driving, and intelligent smart cab, and new use modes continue to develop, a vehicle needs to be positioned with high precision.

The global navigation satellite system can only satisfy a normal positioning requirement. The general positioning precision scale ranges from 5 to 10 m. In some cases, the scale of positioning precision is greater than 10 m. Thus, a high positioning precision requirement at a sub-meter level, a decimeter level, or even a centimeter level cannot be satisfied.

SUMMARY

Embodiments of the present disclosure provide a vehicle positioning method. The method includes determining a first relative horizontal distance between an onboard device and a roadside device at a first moment, a second relative horizontal distance at a second moment, and a third relative horizontal distance at a third moment, the first moment being earlier than the second moment, and the second moment being earlier than the third moment, obtaining position information of the roadside device, determining a first moving distance of a vehicle where the onboard device is located from the first moment to the second moment and a second moving distance of the vehicle from the second moment to the third moment, and based on the first moving distance and the second moving distance, determining a moving trajectory of the vehicle partially overlapping with three circles with the position information of the roadside device as a center and with the first relative horizontal distance, the second relative horizontal distance, and the third relative horizontal distance as radii.

Embodiments of the present disclosure provide an onboard device, including at least one processor and a memory. The memory is communicatively connected to the at least one processor and stores an instruction that, when executed by the at least one processor, causes the at least one processor to determine a first relative horizontal distance between an onboard device and a roadside device at a first moment, a second relative horizontal distance at a second moment, and a third relative horizontal distance at a third moment, the first moment being earlier than the second moment, and the second moment being earlier than the third moment, obtain position information of the roadside device, determine a first moving distance of a vehicle where the onboard device is located from the first moment to the second moment and a second moving distance of the vehicle from the second moment to the third moment, and based on the first moving distance and the second moving distance, determine a moving trajectory of the vehicle partially overlapping with three circles with the position information of the roadside device as a center and with the first relative horizontal distance, the second relative horizontal distance, and the third relative horizontal distance as radii.

Embodiments of the present disclosure provide a roadside device, including at least one processor and a memory. The memory is communicatively connected to the at least one processor and stores an instruction that, when executed by the at least one processor, causes the at least one processor to determine a first relative horizontal distance between an onboard device and a roadside device at a first moment, a second relative horizontal distance at a second moment, and a third relative horizontal distance at a third moment, the first moment being earlier than the second moment, and the second moment being earlier than the third moment, obtain position information of the roadside device, determine a first moving distance of a vehicle where the onboard device is located from the first moment to the second moment and a second moving distance of the vehicle from the second moment to the third moment, and based on the first moving distance and the second moving distance, determine a moving trajectory of the vehicle partially overlapping with three circles with the position information of the roadside device as a center and with the first relative horizontal distance, the second relative horizontal distance, and the third relative horizontal distance as radii.

DETAILED DESCRIPTION OF EMBODIMENTS

Figure 1:
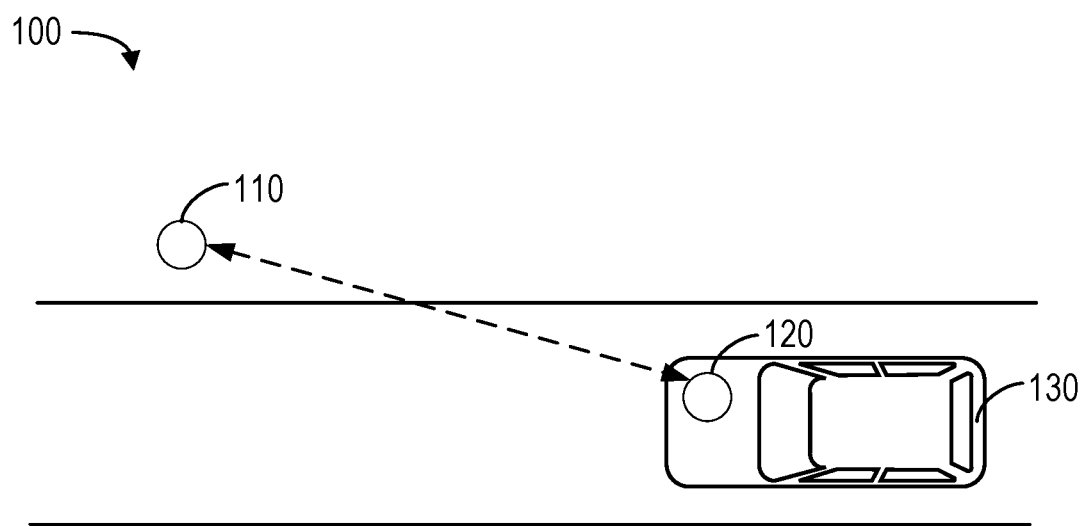
FIG. 1 is a schematic diagram of an information processing environment according to some embodiments of the present disclosure.

Embodiments of the present disclosure are described in detail below in connection with the accompanying drawings and include various details to facilitate understanding embodiments of the present disclosure. Embodiments of the present disclosure are illustrative. Thus, those skilled in the art should know that various changes and modifications made to embodiments of the present disclosure do not depart from the scope and spirit of the present disclosure. Similarly, for clarity and simplicity, descriptions of the known function and the structure are omitted.

In the description of embodiments of the present disclosure, the term "comprising" and a similar expression should be understood to be open-ended, i.e., "including but not limited to." The term "based on" should be understood as "at least partially based on." The term "an embodiment" or "the embodiment" should be understood as "at least one embodiment." The terms "first," "second," etc., can refer to different or same objects. The following can also include other explicit and implicit definitions.

As described above, the traditional global navigation satellite system (GNSS) cannot meet the high-precision positioning requirements. Currently, three technology forms in the high precision solution of the smart transportation and the vehicle positioning can include: 1) a differential positioning method based on ground-based positioning (RTK) and satellite-based positioning (RTD), 2) a technology that closely integrates RTK differential positioning with position information such as inertial navigation position estimation, and 3) high-precision positioning technology for recognizing position information based on an camera or laser point cloud.

The above solutions can achieve a positioning capability for a high-precision position but fail to provide continuous, stable, and reliable high-precision services or require high-cost software and hardware configurations (such as laser and millimeter-wave radar, a high-precision map), which leads to low popularity.

For the differential positioning method based on RTK and RTD, a GNSS receiver is needed to provide basic position information. Then, local differential positioning is performed by combining the basic position information and the RTK data received through a wireless communication network to improve real-time positioning precision.

This solution can usually achieve high precision positioning in an open uncovered area (while the wireless communication network is used, the communication channel needs to be smooth with low latency), which can reach the centimeter-level. However, in an urban area (or a mountain area), when buildings, overpasses, shading, and slopes are nearby, the positioning can be interfered with by multipaths to have a large displacement. Meanwhile, the latency of the wireless communication network can also affect the position precision. Thus, when subject to random interference of the environment, the positioning precision is poor, unreliable, and unstable.

For the solution of integrating the inertial navigation technology and the RTK or another position matching technology, the high precision inertial navigation device and RTK differential data are needed to support a reliable position precision. Considering that the RTK differential positioning input can be affected by an environment factor, the reliability and the stability of the positioning output of the solution cannot satisfy the requirement of the actual scene.

For the high-precision positioning technology based on image recognition or laser point cloud recognition (SLAM Technology), the vehicle is required to be equipped with a high-precision camera or a laser radar matching with a high-precision map. The device and function requirements are only suitable for an advanced autonomous drive vehicle, and the cost for the device and function can be unacceptable for a normal vehicle.

To address one or a plurality of above problems and other potential problems, embodiments of the present disclosure provide a solution for vehicle positioning. In the solution, relative horizontal distances between an onboard device and a roadside device can be determined at a first moment, a second moment, and a third moment. The onboard device and the roadside device can be devices with high precision (i.e., sub-meter level) positioning capability using technologies such as ultra-wideband (UWB) and SparkLink/NearLink technologies. In some embodiments, the onboard device and the roadside device may be UWB devices. In other embodiments, the onboard device and the roadside device may be SparkLink/NearLink devices. Depending on the use scenarios, the onboard device and the roadside device may be implemented under various short-range wireless technology protocols.

The onboard device and the roadside device using the UWB technology are taken as an example as follows to describe the present disclosure. For example, the onboard device and the roadside device using UWB technology can also be referred to as an onboard UWB device and a roadside UWB device. The first moment can be earlier than the second moment, and the second moment can be earlier than the third moment. The position information of the roadside UWB device can be obtained. A first moving distance of the vehicle where the onboard UWB device is located can be determined from the first moment to the second moment, and a second moving distance of the vehicle where the onboard UWB device is located can be determined from the second moment to the third moment. Based on the first moving distance and the second moving distance, movement trajectories of the vehicle can be determined at three circles with the position information of the roadside UWB device as the center and with the first relative horizontal distance, the second relative horizontal distance, and the third relative horizontal distance as radii, respectively. Then, the high-precision vehicle positioning can be achieved at a low cost.

Embodiments of the present disclosure are described in detail in connection with the accompanying drawings.

FIG. 1 is a schematic diagram of an information processing environment 100 according to some embodiments of the present disclosure. The information processing environment 100 includes a roadside ultra-wideband (UWB) device 110, an onboard UWB device 120, and a vehicle 130 where the onboard UWB device 120 is located. The roadside UWB device 110 can be located on a side of any road or in a tunnel.

The roadside UWB device 110 and the onboard UWB device 120 can perform communication and positioning through the UWB technology. For example, the roadside UWB device 110 or the onboard UWB device 120 can determine time of flight (ToF) between the roadside UWB device 110 and the onboard UWB device 120 to determine the relative distance between the roadside UWB device 110 and the onboard UWB device 120.

In some embodiments, the roadside UWB device 110 and the onboard UWB device 120 can include one or a plurality of processing units, including a specialized processing unit, such as a graphics processing unit (GPU), a field-programmable gate array (FPGA), and an application-specific integrated circuit (ASIC), and a general-purpose processing unit such as a central processing unit (CPU). The roadside UWB device 110 and the onboard UWB device 120 can include a memory communicatively connected to the one or plurality of processing units. The memory can store instructions that can be executed by the one or plurality of processing units. The instructions can be executed by the one or plurality of processing units to cause the one or plurality of processing units to perform relevant functions. The roadside UWB device 110 and the onboard UWB device 120 can further include a communication unit configured for UWB communication therebetween.

The roadside UWB device 110 or the onboard UWB device 120 can be configured to determine the first relative horizontal distance at the first moment, the second relative horizontal distance at the second moment, and the third relative horizontal distance at the third moment between the onboard UWB device 120 and the roadside UWB device 110. The first moment can be earlier than the second moment, and the second moment can be earlier than the third moment. The roadside UWB device 110 or the onboard UWB device 120 can be further configured to obtain the position information of the roadside UWB device 110, determine the first moving distance and the second moving distance of the vehicle 130 where the onboard UWB device is located from the first moment to the second moment and from the second moment to the third moment, and determine the movement trajectories of the vehicle 130 at the three circles with the position information of the roadside UWB device as the center and with the first relative horizontal distance, the second horizontal distance, and the third horizontal distance as the radii, respectively, based on the first moving distance and the second moving distance.

Thus, high-precision vehicle positioning can be achieved at a low cost.

Figure 2:
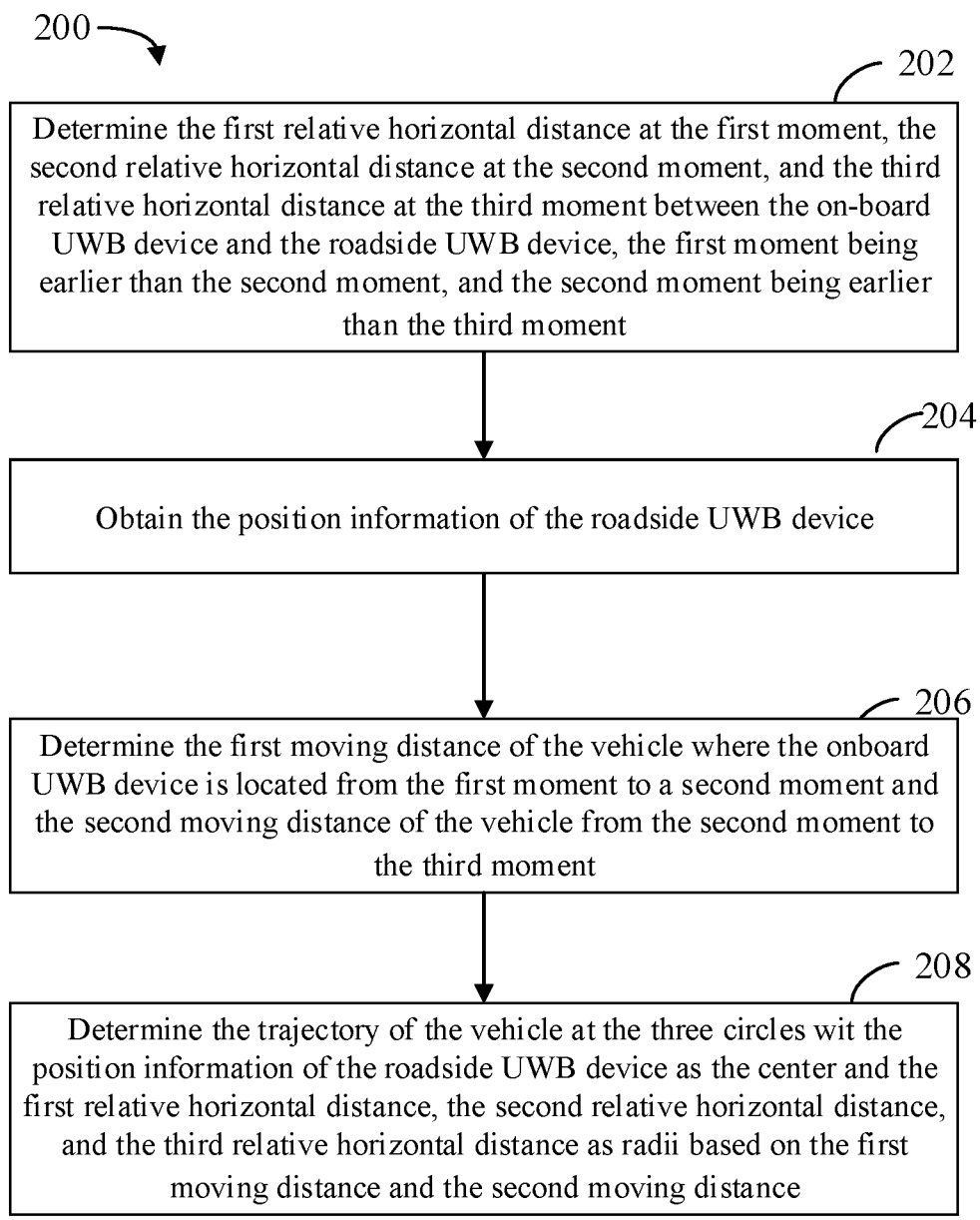
FIG. 2 is a schematic diagram of a vehicle positioning method according to some embodiments of the present disclosure.

FIG. 2 is a schematic flowchart of a vehicle positioning method 200 according to some embodiments of the present disclosure. For example, the method 200 is performed by roadside UWB device 110 or the onboard UWB device 120 shown in FIG. 1. The method 200 can further include additional blocks not shown and/or blocks that are omitted. The scope of the present disclosure is not limited here.

At 202, the roadside UWB device 110 or the onboard UWB device 120 determines the first relative horizontal distance at the first moment, the second relative horizontal distance at the second moment, and the third relative horizontal distance at the third moment between the onboard UWB device 120 and the roadside UWB device 110. The first moment is earlier than the second moment, and the second moment is earlier than the third moment.

In some embodiments, the roadside UWB device 110 or the onboard UWB device 120 can determine the first relative distance between the onboard UWB device 120 and the roadside UWB device 110 at the first moment. The roadside UWB device 110 or the onboard UWB device 120 can obtain the installation height of the onboard UWB device 120 and the installation height of the roadside UWB device 110. Subsequently, the roadside UWB device 110 or the onboard UWB device 120 can determine the relative vertical distance between the roadside UWB device 110 and the onboard UWB device 120 based on the installation height of the onboard UWB device 120 and the installation height of the roadside UWB device 110. Then, the roadside UWB device 110 or the onboard UWB device 120 can determine the first relative horizontal distance based on the first relative distance and the relative vertical distance. Block 202 can be performed before block 204, and block 204 can also be performed before block 202, or block 202 and block 204 can be executed in parallel, which is not limited in the present disclosure.

Figure 3:
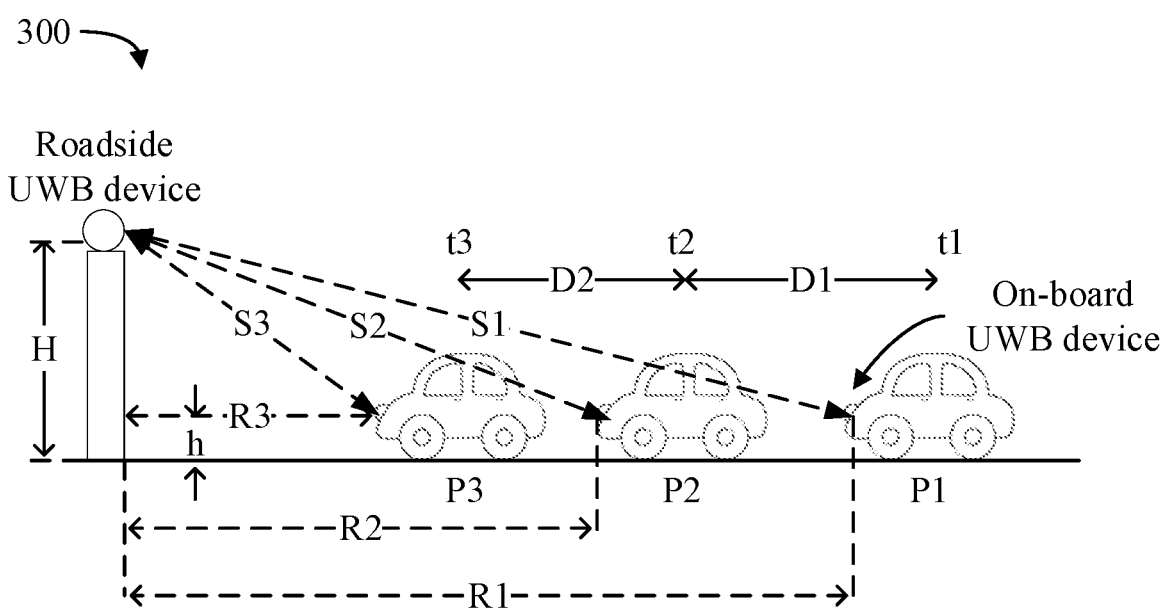
FIG. 3 is a schematic diagram of statuses of a vehicle at different time according to some embodiments of the present disclosure.

As shown in FIG. 3, the vehicle 130 where the onboard UWB device 120 is located can be at P1, P2, and P3 at first moment t1, second moment t2, and third moment t3, respectively, to get closer to the roadside UWB device 110. At first moment t1, second moment t2, and third moment t3, the time of flight between the onboard UWB device 120 and the roadside UWB device 110 are ToF1, ToF2, and ToF3, respectively. Thus, first relative distance S1, second relative distance S2, and third relative distance S3 between the onboard UWB device 120 and the roadside UWB device 110 can be determined as ToF1*c, ToF2*c, and ToF3*c, respectively, where c is the speed of light. Determining the relative distance between the roadside UWB device 110 and the onboard UWB device 120 based on the time of flight is just an example, and other suitable methods, such as time-of-arrival, can also be used, which is not limited in the present disclosure.

The installation height of the roadside UWB device 110 is denoted as H, and the installation height of the onboard UWB device 120 is denoted as h. The installation height of the roadside UWB device 110 can be stored at the roadside UWB device 110, and the installation height of the onboard UWB device 120 can be stored at the onboard UWB device 120. When the method 200 is executed at the roadside UWB device 110, the roadside UWB device 110 can receive the installation height of the onboard UWB device 120 from the onboard UWB device 120. When the method 200 is executed at the onboard UWB device 120, the onboard UWB device 120 can receive the installation height of the roadside UWB device 110 from the roadside UWB device 110. The relative vertical distance between the roadside UWB device 110 and the onboard UWB device 120 is H-h. The first relative horizontal distance R1 can be determined as $R1=[S1^2-(H-h)^2]^{1/2}$.

The second relative horizontal distance R2 and the third relative horizontal distance R3 can be determined in a similar manner to the first relative horizontal distance as $R2=[S2^2-(H-h)^2]^{1/2}$ and $R3=[S3^2-(H-h)^2]^{1/2}$, which are not repeated here.

Thus, the inaccurate positioning problem caused by the height difference between the onboard UWB device and the roadside UWB device can be illuminated, and the positioning accuracy can be improved.

Before determining the first relative distance, the second relative distance, and the third relative distance, authentication, connection, and time calibration can be performed after the roadside UWB device 110 and the onboard UWB device 120 enter detection ranges (e.g., 20 m) thereof.

At 204, the roadside UWB device 110 or the onboard UWB device obtains the position information of the roadside UWB device 110.

The position information of the roadside UWB device 110 can include, for example, but is not limited to, longitude and latitude information of the roadside UWB device 110, which can be stored at the roadside UWB device 110.

When the method 200 is performed at the onboard UWB device 120, the onboard UWB device 120 can receive the position information of the roadside UWB device 110 from the roadside UWB device 110.

At 206, the roadside UWB device 110 or the onboard UWB device 120 determines the first moving distance of the vehicle 130 where the onboard UWB device 120 is located from the first moment to a second moment and the second moving distance of the vehicle 130 from the second moment to the third moment.

When the method 200 is executed at the onboard UWB device 120, the onboard UWB device 120 can obtain the speed of the vehicle 130 between the first moment and the third moment, determine the first moving distance based on the speed and the time interval between the first moment and the second moment, and determine the second moving distance based on the speed and the time interval between the second moment and the third moment.

As shown in FIG. 3, the speed of the vehicle 130 where the onboard UWB device 120 is located between first moment t1 and third moment t3 is V (e.g., average speed). Then, first moving distance D1 is (t2–t1)*V, and second moving distance D2 is (t3–t2)*V.

When the method 200 is executed at the roadside UWB device 110, the roadside UWB device 110 can receive the first moving distance and the second moving distance from the onboard UWB device 120.

At 208, the roadside UWB device 110 or onboard UWB device 120 determines trajectories of the vehicle 130 at the three circles with the position information of the roadside UWB device 110 as the center and the first relative horizontal distance, the second relative horizontal distance, and the third relative horizontal distance as radii based on the first moving distance and the second moving distance.

The method of determining the trajectories of the vehicle 130 at the three circles with the position information of the roadside UWB device 110 as the center and the first relative horizontal distance, the second relative horizontal distance, and the third relative horizontal distance as radii are described in connection with FIG. 4 to FIG. 7.

When the method 200 is executed at the roadside UWB device 110, in some embodiments, the roadside UWB device 110 can also send a moving trajectory of the vehicle 130 to the onboard UWB device 120.

Thus, the high-precision vehicle positioning can be achieved using only one onboard UWB device and one roadside UWB device, which reduces cost compared to the traditional solution. Since the UWB positioning has the high precision and is not affected by the environment, the UWB positioning can have a broader and more reliable application scene. In addition, in a specific area, when GNSS is subject to the interference of the environment, the roadside UWB device can be a good supplement for providing the positioning information.

Figure 4:
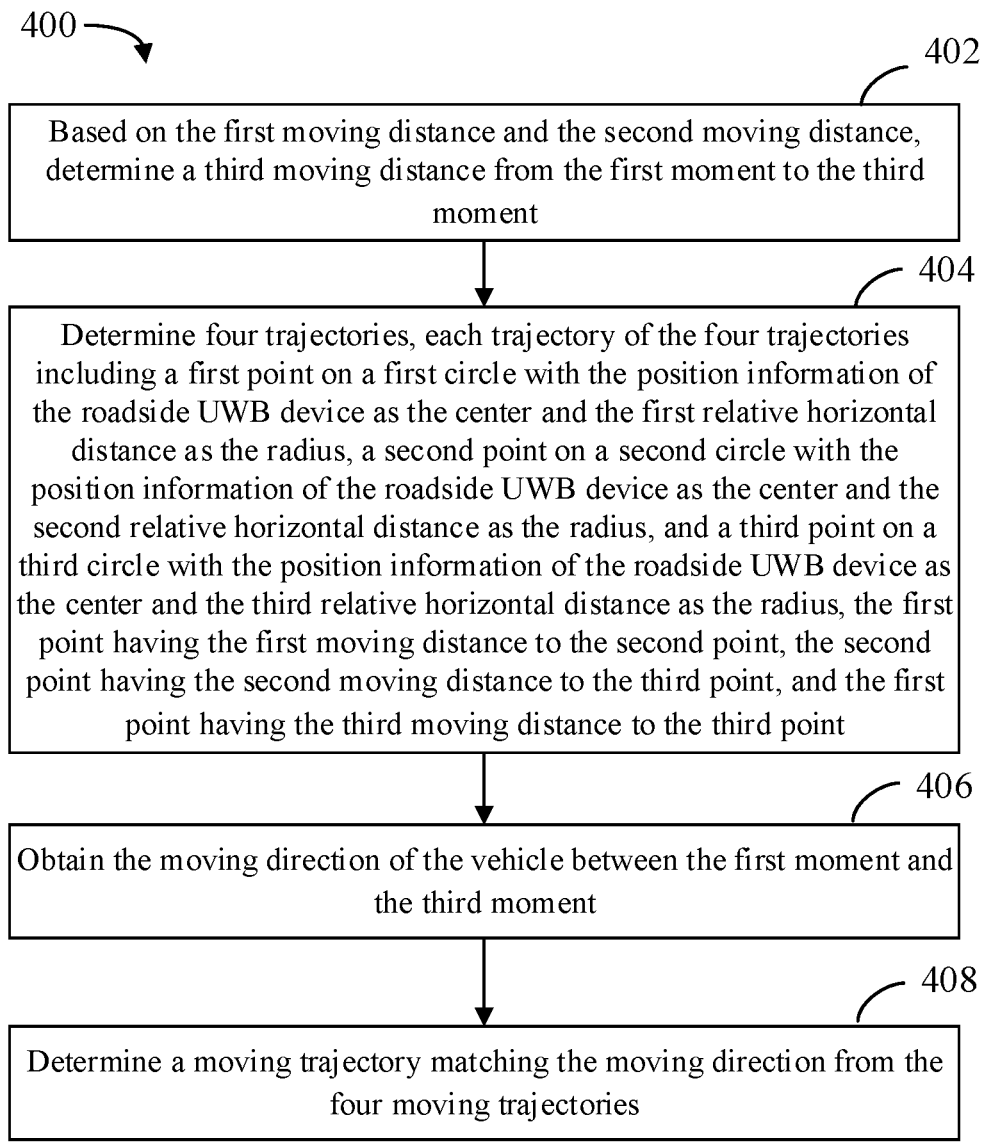
FIG. 4 is a schematic diagram of a method for determining vehicle moving trajectories that are partially overlapping with three circles by using a first relative horizontal distance, a second relative horizontal distance, and a third relative horizontal distance as radii and using position information of a roadside device as a center according to some embodiments of the present disclosure.

FIG. 4 is a schematic flowchart of the method 400 for determining the moving trajectories of the vehicle 130 partially overlapping with the three circles by using the first relative horizontal distance, the second relative horizontal distance, and the third relative horizontal distance as radii and using position information of the roadside UWB device 110 as the center according to some embodiments of the present disclosure. For example, the method 400 is performed by the roadside UWB device 110 or the onboard UWB device 120 shown in FIG. 1. The method 400 can also include additional blocks not shown and/or blocks that are omitted, which is not limited in the present disclosure. In some embodiments, the moving direction of the vehicle between the first moment and the third moment can be considered unchanged.

At 402, the roadside UWB device 110 or onboard UWB device 120, based on the first moving distance and the second moving distance, determines a third moving distance from the first moment to the third moment.

Since the moving direction of the vehicle is not changed, first moving distance D1 can be added to second moving distance D2 to obtain third moving distance D3=D1+D2.

At 404, the roadside UWB device 110 or the onboard UWB device 120 determines four trajectories. Each trajectory of the four trajectories includes a first point on a first circle with the position information of the roadside UWB device 110 as the center and the first relative horizontal distance as the radius, a second point on a second circle with the position information of the roadside UWB device 110 as the center and the second relative horizontal distance as the radius, and a third point on a third circle with the position information of the roadside UWB device 110 as the center and the third relative horizontal distance as the radius. The first point has the first moving distance to the second point, the second point has the second moving distance to the third point, and the first point has the third moving distance to the third point.

Figure 5A:
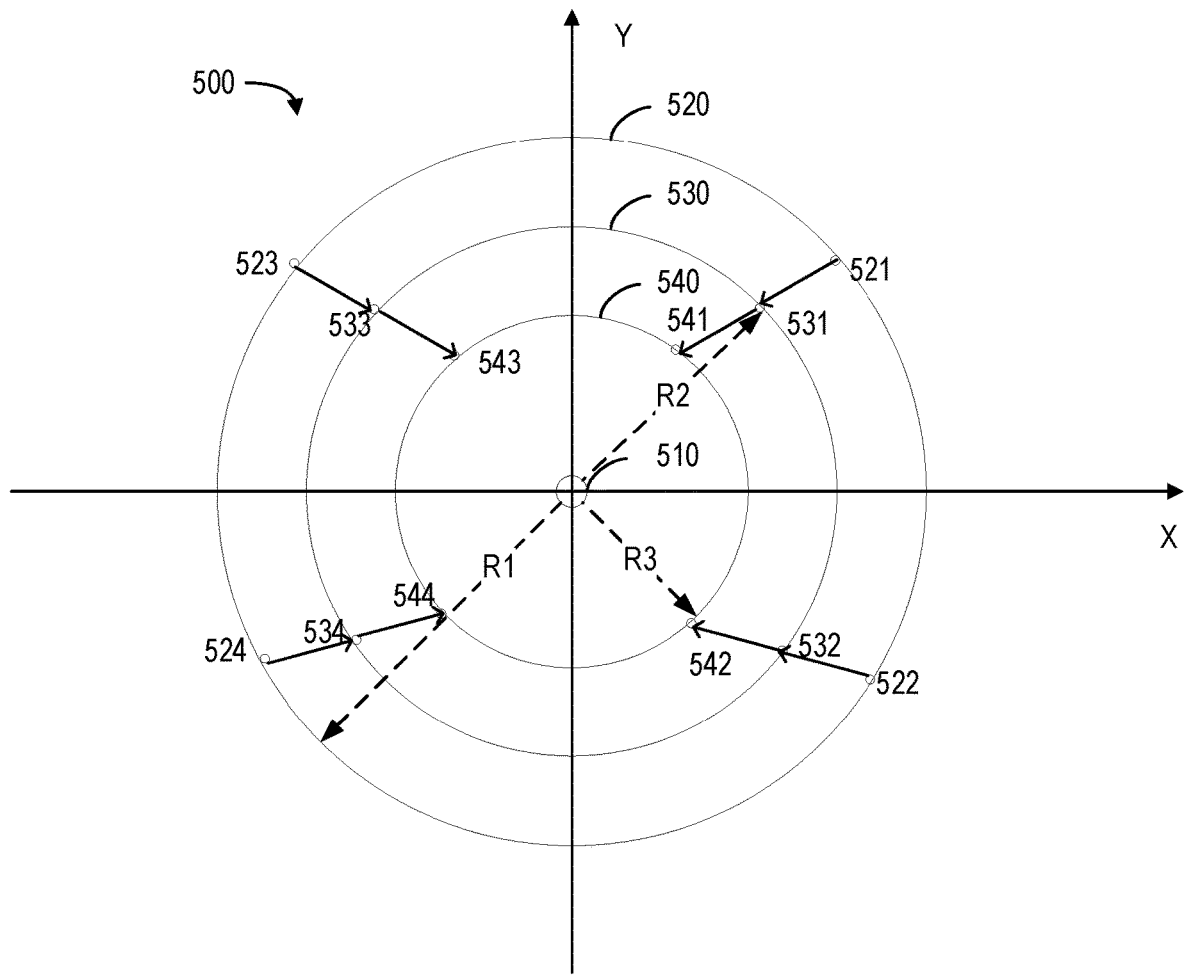
FIG. 5A is a schematic diagram of a process for determining vehicle moving trajectories that are partially overlapping with three circles by using a first relative horizontal distance, a second relative horizontal distance, and a third relative horizontal distance as radii and using position information of a roadside device as a center according to some embodiments of the present disclosure.

As shown in FIG. 5A, the three circles include the first circle 520 with the position information of the roadside UWB device 110 as the center and the first relative horizontal distance R1 as the radius, the second circle 530 with the position information of the roadside UWB device 110 as the center and the second relative horizontal distance R2 as the radius, and the third circle 540 with the position information of the roadside UWB device 110 as the center and the third relative horizontal distance R3 as the radius.

For example, the position information of the roadside UWB device can be represented as (a, b), the first point on the first circle 520 can be represented as (X1, Y1), and the second point on the second circle 530 can be represented as (X2, Y2), the third point on the third circle 540 can be represented as (X3, Y3). The first point, the second point, and the third point can satisfy the following conditions:

$$(X1-a)^2 + (Y1-b)^2 = R1^2; \qquad 1)$$

$$(X2-a)^2 + (Y2-b)^2 = R2^2; \qquad 2)$$

$$(X3-a)^2 + (Y3-b)^2 = R3^2; \qquad 3)$$

$$(X1-X2)^2 + (Y1-Y2)^2 = D1^2; \quad 4)$$

$$(X3-X2)^2 + (Y3-Y2)^2 = D2^2; \text{ and} \quad 5)$$

$$(X1-X3)^2 + (Y1-Y3)^2 = D3^2. \quad 6)$$

By solving the above 6-element quadratic equations, four sets of solutions can be calculated, that is, 4 moving trajectories, including (first point 521, second point 531, third point 541), (first point 522, second point 532, third point 542), (first point 523, second point 533, third point 543), and (first point 524, second point 534, third point 544).

At 406, the roadside UWB device 110 or the onboard UWB device 120 obtains the moving direction of the vehicle 130 between the first moment and the third moment.

When the method is executed at the onboard UWB device 120, the onboard UWB device 120 can obtain the GNSS signal of the vehicle 130 where the onboard UWB device 120 is located between the first moment and the third moment to determine the moving direction of the vehicle 130 between the first moment and the third moment. In some embodiments, the onboard UWB device 120 can obtain direction sensor information or angular speed sensor information of the vehicle 130 between the first moment and the third moment to determine the moving direction of the vehicle 130 between the first moment and the third moment.

When the method is executed at the roadside UWB device 110, the roadside UWB device 110 can receive the moving direction from the onboard UWB device 120.

At 408, the roadside UWB device 110 or the onboard UWB device 120 determines a moving trajectory matching the moving direction from the four moving trajectories.

After the four moving trajectories are calculated, the moving directions of the four moving trajectories can be determined. Then, the moving direction of the vehicle can be matched with the moving directions of the four moving trajectories under the same coordinate system. For example, the moving direction of the vehicle and the moving directions of the four moving trajectories may be under the global coordinate system or relative to the roadside UWB device. For example, if the moving direction of the vehicle is from upper right to lower left, the matching moving trajectory can be determined to be (first point 521, second point 531, third point 541). If the moving direction of the vehicle is from lower right to upper left, the matching moving trajectory can be determined to be (first point 522, second point 532, third point 542). If the moving direction of the vehicle is from upper left to lower right, the matching moving trajectory can be determined to be (first point 523, second point 533, third point 543). If the moving direction of the vehicle is from bottom left to top right, then the matching moving trajectory can be determined to be (first point 524, second point 534, third point 544). The matching moving trajectory can be determined based on the moving direction of the vehicle. This solution can be suitable for the situation when the roadside UWB device 110 is located on two sides of the road (that is, one side of the roadside UWB device 110 has a lane, and the other side of the roadside UWB device 110 does not have a lane) or an isolation zone exists in the middle of the road (that is, sides of the roadside UWB device 110 each has a lane).

In some embodiments, at 406, the roadside UWB device 110 or the onboard UWB device 120 obtains map lane information within a predetermined range with the position information of the roadside UWB device 110 as the center. The map lane information can indicate a lane area and a lane direction. The predetermined range can include, for example, but is not limited to a rectangle, a circle, etc. with a predetermined size. At 408, the roadside UWB device 110 or the onboard UWB device 120 determines a moving trajectory matching the map lane information from the four moving trajectories. The solution can be suitable to the situation that the roadside UWB devices 110 are located on both sides of the road. That is, one side of the roadside UWB device 110 has a lane, and the other side of the roadside UWB device 110 does not have a lane.

The roadside UWB device may need to be mapped onto the map to determine the position of the roadside UWB device on the map. Then, the relative position relationship between the lanes and the lane direction and the roadside UWB device can be determined. For example, if the map lane information indicates that the lane area is located on the upper side of the roadside UWB device 110 and the lane direction is from right to left, the matching moving trajectory can be determined to be (first point 521, second point 531, third point 541). If the map lane information indicates that the lane area is located on the lower side of the roadside UWB device 110 and the lane direction is from right to left, the matching moving trajectory can be determined to be (first point 522, second point 532, third point 542). If the map lane information indicates that the lane area is located on the upper side of the roadside UWB device 110 and the lane direction is from left to right, the matching moving trajectory can be determined to be (first point 523, second point 533, third point 543). If the map lane information indicates that the lane area is located on the lower side of the roadside UWB device 110 and the lane direction is from left to right, the matching moving trajectory can be determined to be (first point 524, second point 534, third point 544). Thus, the map lane information can be used to filter out the matching moving trajectories.

Thus, the moving trajectory of the vehicle relative to the roadside UWB device can be accurately determined.

In some embodiments, the moving trajectories can be determined according to the moving direction of the vehicle and the lane direction. An example is described as follows.

Figure 5B:
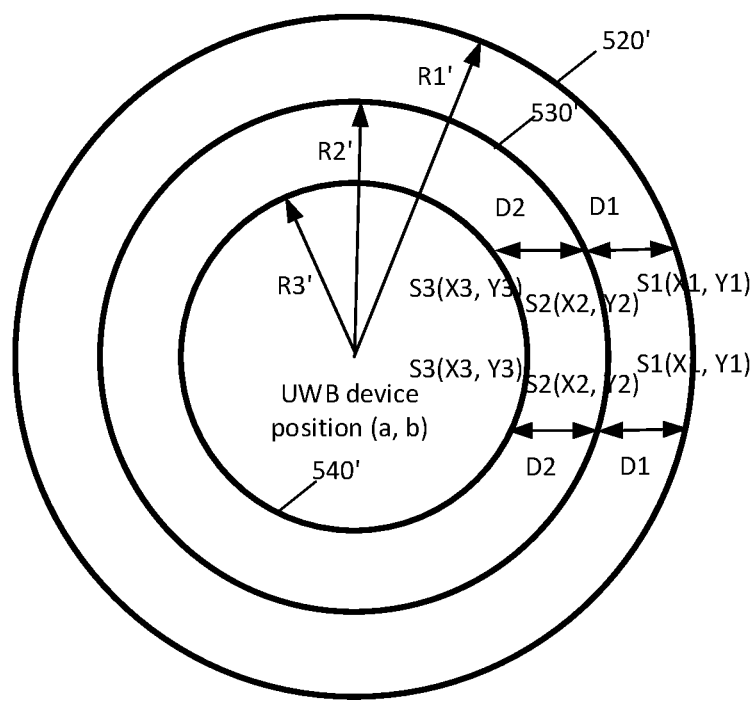
FIG. 5B is a schematic diagram of a process for determining vehicle moving trajectories that are partially overlapping with three circles by using a first relative horizontal distance, a second relative horizontal distance, and a third relative horizontal distance as radii and using position information of a roadside device as a center according to some embodiments of the present disclosure.

As shown in FIG. 5B, the three circles include the first circle 520' with the position information of the roadside UWB device 110 as the center and the first relative horizontal distance R1' as the radius, the second circle 530' with the position information of the roadside UWB device 110 as the center and the second relative horizontal distance R2' as the radius, and the third circle 540' with the position information of the roadside UWB device 110 as the center and the third relative horizontal distance R3' as the radius.

For example, the position information of the roadside UWB device can be represented as (a, b), the first point on the first circle 520' can be represented as S1(X1, Y1), and the second point on the second circle 530' can be represented as S2(X2, Y2), the third point on the third circle 540' can be represented as S3(X3, Y3). A first distance D1 between the first point and the second point, a second distance D2 between the second point and the third point, a third distance D3 between the first point and the third point, the first point, the second point, and the third point can satisfy the following conditions:

$$(X1-a)^2 + (Y1-b)^2 = R1'^2; \quad 1)$$

$$(X2-a)^2 + (Y2-b)^2 = R2'^2; \quad 2)$$

-continued $$(X3-a)^2 + (Y3-b)^2 = R3'^2; \quad 3)$$

$$(X1-X2)^2 + (Y1-Y2)^2 = D1^2; \quad 4)$$

$$(X3-X2)^2 + (Y3-Y2)^2 = D2^2; \text{ and} \quad 5)$$

$$(X1-X3)^2 + (Y1-Y3)^2 = D3^2. \quad 6)$$

By solving the above 6-element quadratic equations, four sets of solutions can be calculated, that is, 4 moving trajectories. Two sets of solutions can be eliminated by determining whether the vehicle is getting closer to or away from the roadside UWB device. The remaining two sets of solutions describe the moving direction of the vehicle and are symmetrical about the position of the roadside UWB device. Since the roadside UWB device is mounted at the side of the road, one of the remaining two sets of solutions that describes the vehicle driving off road can be eliminated. Then, one trajectory can be determined.

Figure 6:
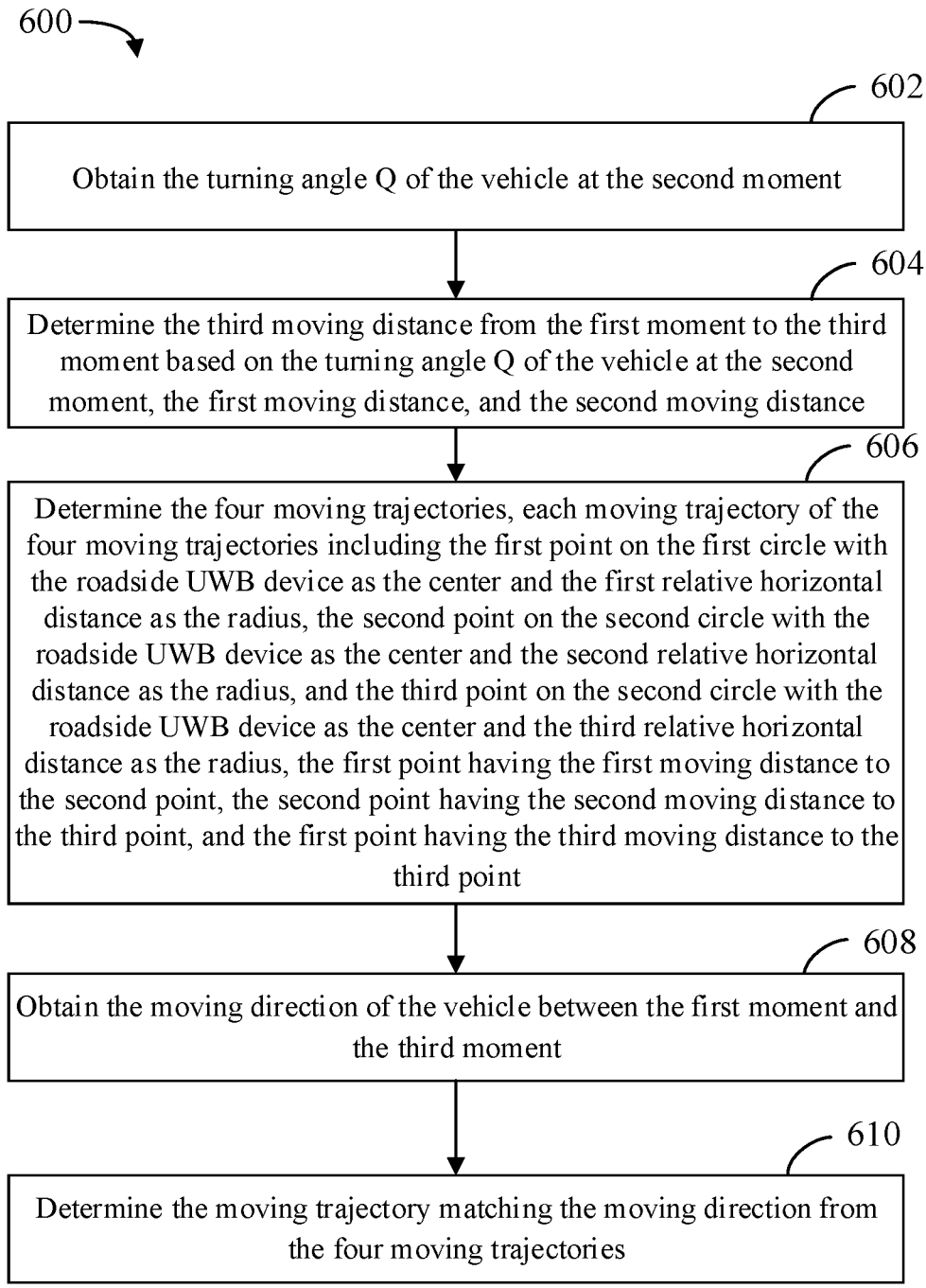
FIG. 6 is a schematic diagram of another method for determining vehicle moving trajectories that are partially overlapping with three circles by using a first relative horizontal distance, a second relative horizontal distance, and a third relative horizontal distance as radii and using position information of a roadside device as a center according to some embodiments of the present disclosure.

FIG. 6 is a schematic flowchart of another method 600 for determining the moving trajectories of the vehicle 130 on the three circles by using the first relative horizontal distance, the second relative horizontal distance, and the third relative horizontal distance as radii and using the position information of the roadside UWB device as the center according to some embodiments of the present disclosure. For example, the method 600 is executed by the roadside UWB device 110 or the onboard UWB device 120 shown in FIG. 1. The method 600 can also include additional blocks that are not shown and/or blocks that can be omitted, which is not limited in the present disclosure. In some embodiments, the moving direction of the vehicle changes at the second moment. The moving direction from the second moment to the third moment turns relative to the moving direction from the first moment to the second moment, for example, the turning angle is Q.

At 602, the roadside UWB device 110 or the onboard UWB device 120 obtains the turning angle Q of the vehicle 130 at the second moment.

When the method is executed at the roadside UWB device 110, the roadside UWB device 110 can obtain the turning angle of the vehicle 130 at the second moment from the onboard UWB device 120.

When the method is executed at the onboard UWB device 120, the onboard UWB device 120 can obtain the turning angle of the vehicle 130 at the second moment.

At 604, the roadside UWB device 110 or the onboard UWB device 120 determines the third moving distance from the first moment to the third moment based on the turning angle Q of the vehicle 130 at the second moment, the first moving distance, and the second moving distance.

The turning angle of the vehicle 130 at the second moment is Q. Then, an angle between first moving distance D1 and second moving distance D2 is 180–Q. The third moving distance can be calculated through the cosine theorem $D3=(D1^2+D2^2-2D^1 \times D2 \times \cos(180-Q))^{1/2}$.

At 606, the roadside UWB device 110 or the onboard UWB device 120 determines the four moving trajectories. Each moving trajectory of the four moving trajectories includes the first point on the first circle with the roadside UWB device 110 as the center and the first relative horizontal distance as the radius, the second point on the second circle with the roadside UWB device 110 as the center and the second relative horizontal distance as the radius, and the third point on the second circle with the roadside UWB device 110 as the center and the third relative horizontal distance as the radius. The first point has the first moving distance to the second point. The second point has the second moving distance to the third point. The first point has the third moving distance to the third point.

Figure 7:
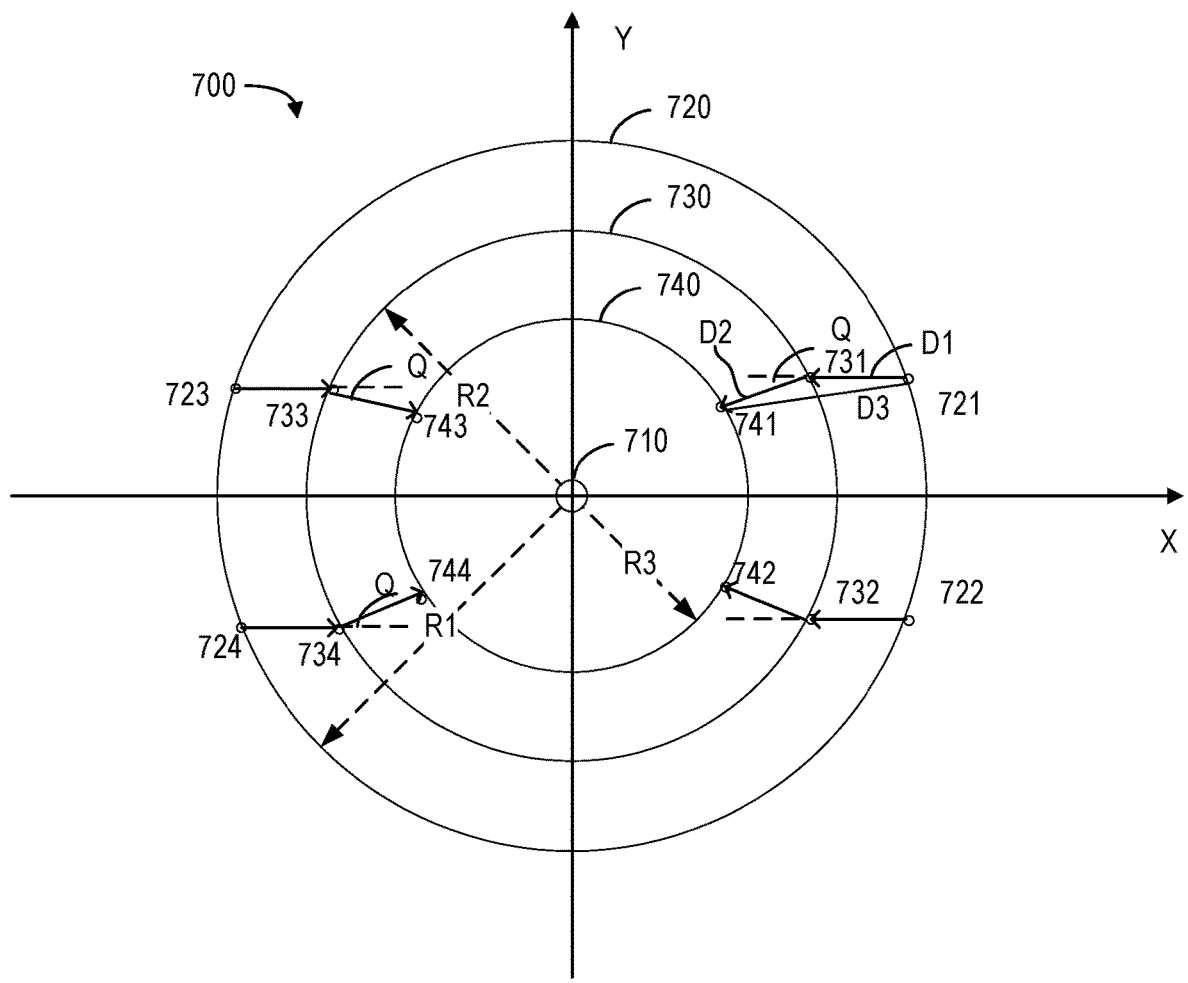
FIG. 7 is a schematic diagram of another process for determining vehicle moving trajectories that are partially overlapping with three circles by using a first relative horizontal distance, a second relative horizontal distance, and a third relative horizontal distance as radii and using position information of a roadside device as a center according to some embodiments of the present disclosure.

As shown in FIG. 7, the three circles include the first circle 720 with the position information of the roadside UWB device 110 as the center 710 and the first relative horizontal distance R1 as the radius, the second circle 730 with the position information of the roadside UWB device 110 as the center 710 and the second relative horizontal distance R1 as the radius, and the third circle 740 with the position information of the roadside UWB device 110 as the center 710 and the third relative horizontal distance R3 as the radius.

For example, the position information of the roadside UWB device can be represented as (a, b), the first point on the first circle 720 can be represented as (X1, Y1), and the second point on the second circle 730 can be represented as (X2, Y2), the third point on the third circle 740 can be represented as (X3, Y3). The first point, the second point, and the third point can satisfy the following conditions:

$$(X1-a)^2 + (Y1-b)^2 = R1^2; \quad 1)$$

$$(X2-a)^2 + (Y2-b)^2 = R2^2; \quad 2)$$

$$(X3-a)^2 + (Y3-b)^2 = R3^2; \quad 3)$$

$$(X1-X2)^2 + (Y1-Y2)^2 = D1^2; \quad 4)$$

$$(X3-X2)^2 + (Y3-Y2)^2 = D2^2; \text{ and} \quad 5)$$

$$(X1-X3)^2 + (Y1-Y3)^2 = D3^2. \quad 6)$$

By solving the above 6-element quadratic equations, four sets of solutions can be calculated, that is, 4 moving trajectories, including (first point 721, second point 731, third point 741), (first point 722, second point 732, third point 742), (first point 723, second point 733, third point 743), (first point 724, second point 734, third point 744).

At 608, the roadside UWB device 110 or the onboard UWB device 120 obtains the moving direction of the vehicle 130 between the first moment and the third moment.

When the method is executed at the onboard UWB device 120, the onboard UWB device 120 can obtain the GNSS signal of the vehicle 130 where the onboard UWB device 120 is located between the first moment and the third moment to determine the moving direction of the vehicle 130 between the first moment and the third moment. In some embodiments, the onboard UWB device 120 can obtain the direction sensor information or angular speed sensor information of the vehicle 130 between the first moment and the third moment to determine the moving direction of the vehicle 130 between the first moment and the third moment.

When the method is executed at the roadside UWB device 110, the roadside UWB device 110 can receive the moving direction from the onboard UWB device 120.

At 610, the roadside UWB device 110 or the onboard UWB device 120 determines the moving trajectory matching the moving direction from the four moving trajectories.

After the four moving trajectories are calculated, the moving directions of the four moving trajectories can be determined. Then, the moving direction of the vehicle can be matched with the moving directions of the four moving trajectories under the same coordinate system. For example, the moving direction of the vehicle and the moving directions of the four moving trajectories may be under the global coordinate system or relative to the roadside UWB device. For example, if the moving direction of the vehicle is from upper right to lower left, the matching moving trajectory can be determined to be (first point 721, second point 731, third point 741). If the moving direction of the vehicle is from lower right to upper left, the matching moving trajectory can be determined to be (first point 722, second point 732, third point 742). If the moving direction of the vehicle is from upper left to lower right, the matching moving trajectory can be determined to be (first point 723, second point 733, third point 743). If the moving direction of the vehicle is from lower left to upper right, the matching moving trajectory can be determined to be (first point 724, second point 734, third point 744). Thus, the moving direction of the vehicle can be used to filter out the matching movement trajectory. The solution can be suitable for the situation when the roadside UWB device 110 is located on both sides of the road (that is, one side of the roadside UWB device 110 has a lane, and the other side of the roadside UWB device 110 does not have a lane) or an isolation zone is in the middle of the road (both sides of the roadside UWB device 110 each has a lane).

In some embodiments, at 608, the roadside UWB device 110 or the onboard UWB device 120 obtains the map lane information within the predetermined range with the position information of the roadside UWB device 110 as the center. The map lane information indicates the lane area and the lane direction. The predetermined range can include, for example, but is not limited to a rectangle, a circle, etc. with a predetermined size. At 610, the roadside UWB device 110 or the onboard UWB device 120 determines the moving trajectory matching the map lane information from the four moving trajectories. The solution can be suitable for the situation where the roadside UWB device 110 is located on both sides of the road. That is, one side of the roadside UWB device 110 has a lane, and the other side of the roadside UWB device 110 does not have a lane.

In some embodiments, the roadside UWB device may need to be mapped onto the map to determine the position of the roadside UWB device on the map. Then, the relative position relationship between the lanes and the lane direction and the roadside UWB device can be determined. For example, if the map lane information indicates that the lane area is located on the upper side of the roadside UWB device 110 and the lane direction is from right to left, the matching moving trajectory can be determined to be (first point 721, second point 731, third point 741). If the map lane information indicates that the lane area is located on the lower side of the roadside UWB device 110 and the lane direction is from right to left, the matching moving trajectory can be determined to be (first point 722, second point 732, third point 742). If the map lane information indicates that the lane area is located on the upper side of the roadside UWB device 110 and the lane direction is from left to right, the matching moving trajectory can be determined to be (first point 723, second point 733, third point 743). If the map lane information indicates that the lane area is located on the lower side of the roadside UWB device 110 and the lane direction is from left to right, the matching moving trajectory can be determined to be (first point 724, second point 734, third point 744). Thus, the map lane information can be used to filter out the matching movement trajectory.

Therefore, since the turning angle at the second moment is considered, the moving trajectory of the vehicle relative to the roadside UWB device can be determined more accurately by considering the turning angle at the second moment than without considering the turning angle at the second moment.

In some embodiments, a deflection angle/an angular speed can be obtained for the vehicle through an on-vehicle device (e.g., a gyroscope). When the roadside UWB device is mounted at the side of the road, the deflection angle/the angular speed can be used to filter out the matching movement trajectory. In some embodiments, two moving trajectories inconsistent with the deflection angle/angular speed can be eliminated from the four moving trajectories. The two remaining moving trajectories can be mirror-symmetrical relative to the roadside device. Then, in connection with the mounting position of the roadside device, a moving trajectory on the side of the road where the roadside device is mounted can be eliminated. Then, only one moving trajectory can be obtained.

Figure 8:
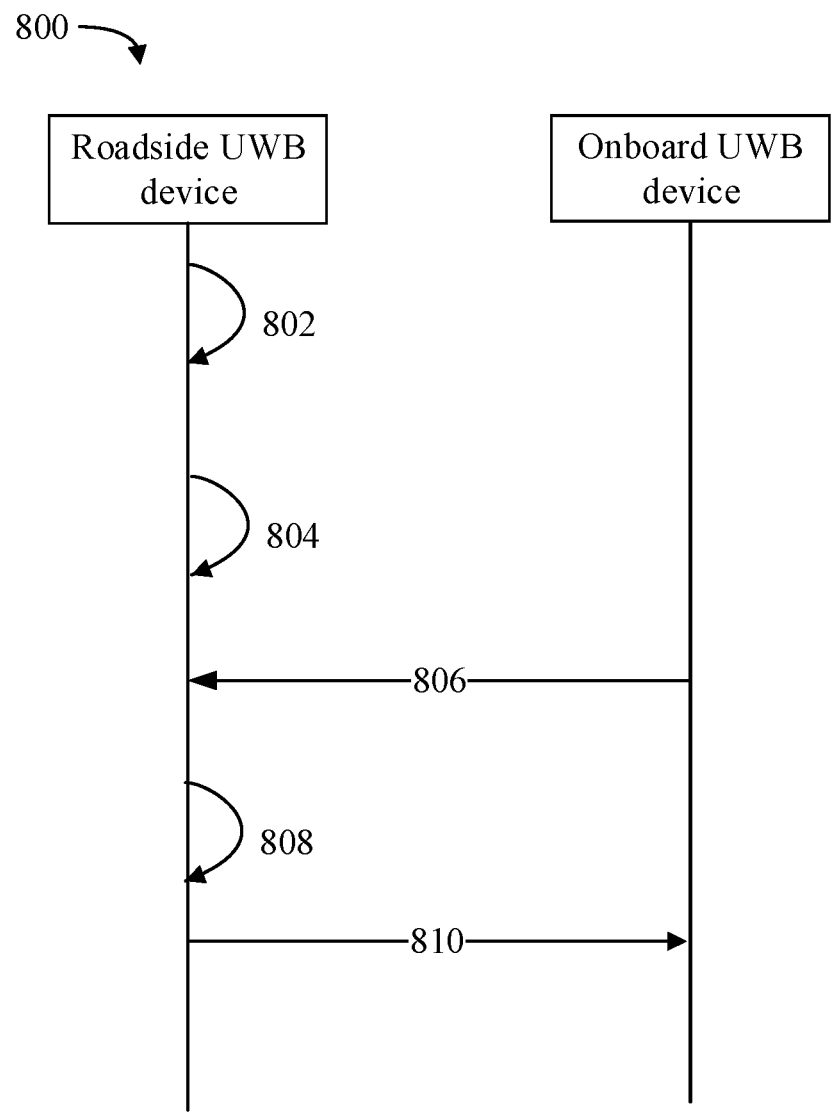
FIG. 8 is a schematic diagram of a vehicle positioning process according to some embodiments of the present disclosure.

FIG. 8 is a schematic diagram of a vehicle positioning process 800 according to some embodiments of the present disclosure. As shown in FIG. 8, at 802, the roadside UWB device 110 determines the first relative horizontal distance between the onboard UWB device 120 and the roadside UWB device 110 at the first moment, the second relative horizontal distance at the second moment, and the third relative horizontal distance at the third moment. The first moment is earlier than the second moment, and the second moment is earlier than the third moment.

At 804, the roadside UWB device 110 obtains position information of the roadside UWB device 110.

At 806, the roadside UWB device 110 receives from the onboard UWB device 120 the first moving distance of the vehicle 130 where the onboard UWB device 120 is located from the first moment to the second moment and the second moving distance of the vehicle 130 from the second moment to the third moment.

At 808, based on the first moving distance and the second moving distance, the roadside UWB device 110 determines the moving trajectories of the vehicle 130 partially overlapping with the three circles with the position information of the roadside UWB device 110 as the center and the first relative horizontal distance, the second relative horizontal distance, the third relative horizontal distance as the radii, respectively.

At 810, the roadside UWB device 110 sends the moving trajectory of the vehicle 130 to the onboard UWB device 120.

Thus, only one onboard UWB device and one roadside UWB device can be used to achieve high-precision vehicle positioning, which reduces costs compared with the traditional solution. Since UWB positioning has high precision and is not affected by the environment, UWB can have a broader application scene and be more reliable. In addition, in a specific area, when the GNSS is affected by the environment, the roadside UWB device can be a good supplement for providing the position information.

Figure 9:
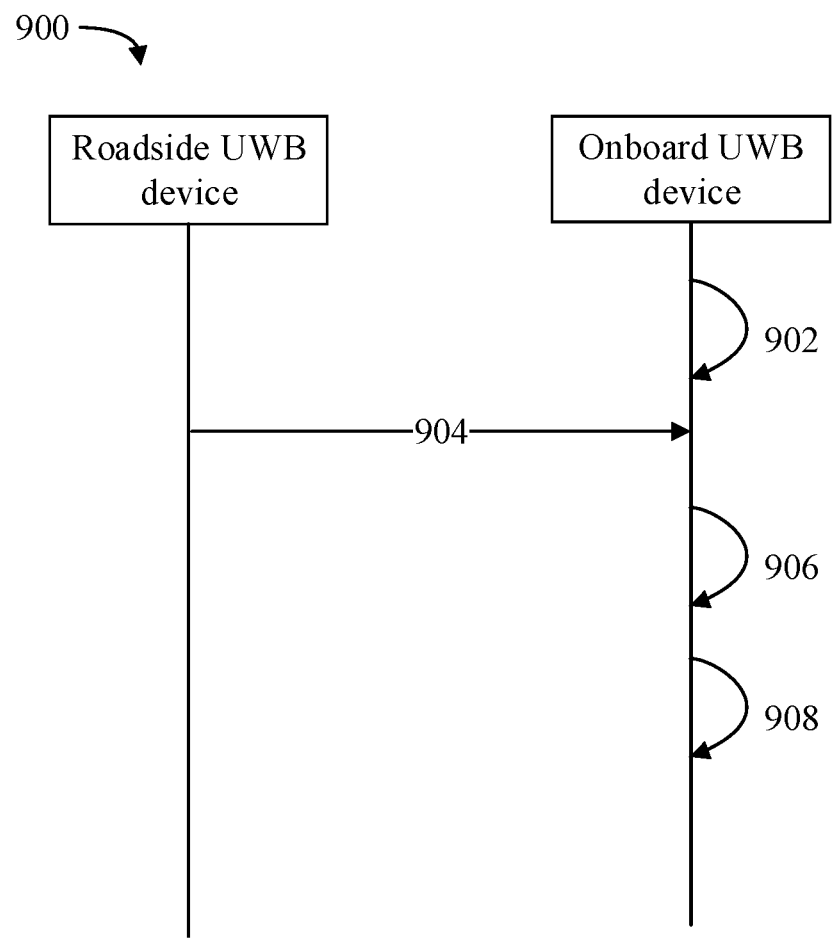
FIG. 9 is a schematic diagram of another vehicle positioning process according to some embodiments of the present disclosure.

FIG. 9 is a schematic diagram of another vehicle positioning process 900 according to some embodiments of the present disclosure. As shown in FIG. 9, at 902, the onboard UWB device 120 determines the first relative horizontal distance between the onboard UWB device 120 and the roadside UWB device 110 at the first moment, the second relative horizontal distance at the second moment, and the third relative horizontal distance at the third moment. The first moment is earlier than the second moment, and the second moment is earlier than the third moment.

At 904, the onboard UWB device 120 receives the position information of the roadside UWB device 110 from the roadside UWB device 110.

At 906, the onboard UWB device 120 determines the first moving distance of the vehicle 130 where the onboard UWB device 120 is located from the first moment to the second moment and the second moving distance of the vehicle 130 from the second moment to the third moment.

At 908, based on the first moving distance and the second moving distance, the onboard UWB device 120 determines the moving trajectory of the vehicle 130 partially overlapping with the three circles with the position information of the roadside UWB device 110 as the center and the first relative horizontal distance, the second relative horizontal distance, and the third relative horizontal distance as the radii, respectively.

Thus, only one onboard UWB device and one roadside UWB device can be used to achieve high-precision vehicle positioning, which reduces costs compared to the traditional solution. Since the UWB positioning has high precision and is not affected by the environment, the UWB positioning can have a broader application scene and be more reliable. In addition, in the specific area, when the GNSS is affected by the environment, the roadside UWB device can be a good supplement for providing the position information.

Figure 10:
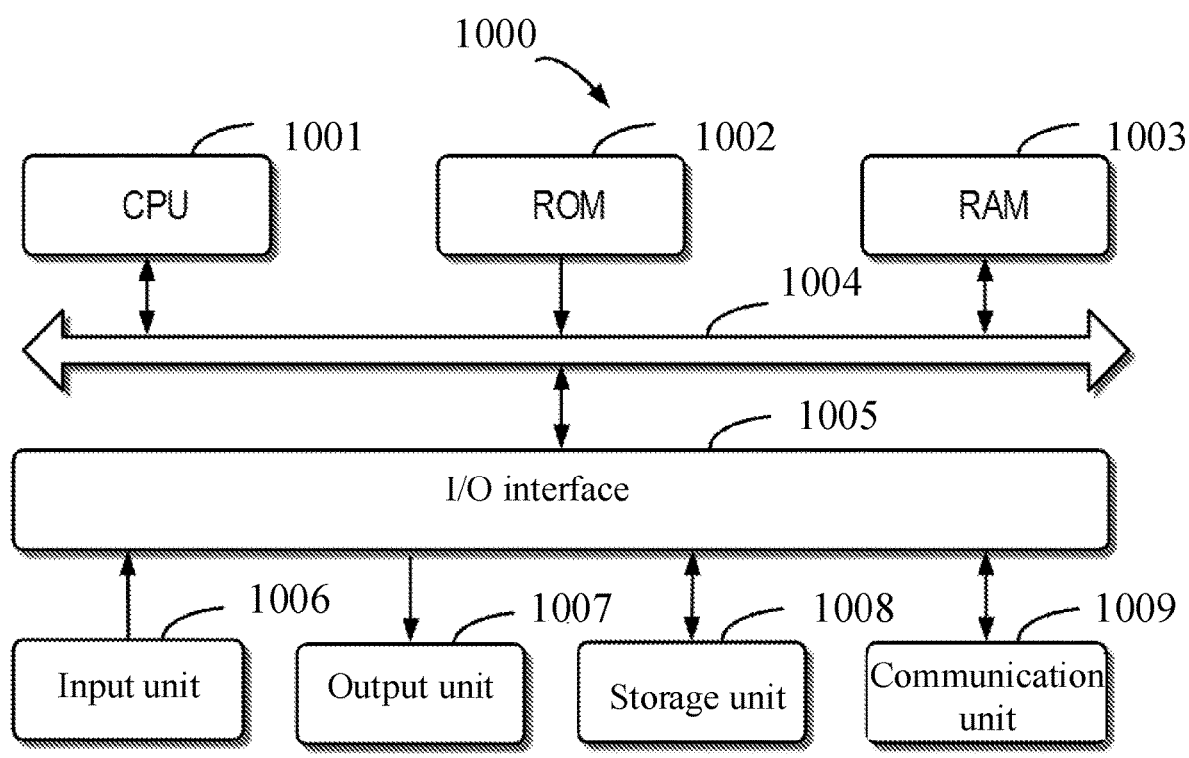
FIG. 10 is a schematic block diagram of a computation device for a vehicle positioning method according to some embodiments of the present disclosure.

FIG. 10 is a schematic block diagram of a computation device 1000 for a vehicle positioning method according to some embodiments of the present disclosure. For example, the roadside UWB device 110 and the onboard UWB device 120 shown in FIG. 1 are implemented by the device 1000. The device 1000 includes a central processing unit (CPU) 1001 that can perform various appropriate actions and processes according to the computer program instructions stored in the read-only memory (ROM) 1002 or the computer program instruction loaded to the random-access memory (RAM) 1003 from the storage unit 1008. The RAM 1003 can also store various programs and data required by the device 1000 for operation. The CPU 1001, the ROM 1002, and the RAM 1003 can be interconnected to each other through a bus 1004. The input/output (I/O) interface 1005 can be also connected to the bus 1004.

A plurality of members of the device 1000 are connected to the input/output interface 91005, including an input unit 1006, such as a keyboard, a mouse, a microphone, etc., an output unit 1007, such as various types of displays, speakers, etc., the storage unit 1008, such as a magnetic disk, an optical disc, etc., and a communication unit 1009, such as a network card, a modem, a wireless communication transceiver, etc. The communication unit 1009 can allow the device 1000 to exchange information/data with other devices through a computer network such as the Internet and/or various telecommunications networks.

The various processes, such as methods 200, 400, 700, and 800, can be executed by the CPU 1001. For example, in some embodiments, methods 200, 400, 700, and 800 can be implemented as a computer software program that is tangibly embodied in a machine-readable medium, such as the storage unit 1008. In some embodiments, a part or all of the computer program can be loaded and/or installed onto device 1000 through the ROM 1002 and/or the communication unit 1009. When the computer program is loaded into the RAM 1003 and executed by the CPU 1001, one or more actions of the methods 200, 400, 700, and 800 can be performed.

The present disclosure relates to methods, apparatuses, systems, computing devices, computer-readable storage media, and/or computer program products. A computer program product can include computer-readable program instructions for performing various aspects of the disclosure.

The computer-readable storage medium can be a tangible device that can retain and store instructions used by an instruction execution device. The computer-readable storage medium can include, for example, but not limited to, an electrical storage device, a magnetic storage device, an optical storage device, an electromagnetic storage device, a semiconductor storage device, or any suitable combination thereof. In some embodiments, the computer-readable storage medium (non-exhaustive list) can include portable computer disks, hard disks, random access memory (RAM), read-only memory (ROM), erasable programmable read-only memory (EPROM) or Flash memory), static random access memory (SRAM), compact disk read-only memory (CD-ROM), digital versatile disk (DVD), memory stick, floppy Disk, a mechanical encoder, such as a punch card or a protrusion structure in the groove storing the instructions, and any combination thereof. The computer-readable storage medium does not be considered as an instantaneous signal, such as radio waves or other freely propagating electromagnetic waves, electromagnetic waves propagating through waveguides or other transmission media (e.g., light pulses through fiber optic cables), or electrical signals transmitted through electrical wires.

The computer-readable program instructions can be downloaded from a computer-readable storage medium to various computing/processing devices, or to an external computer or external storage device through a network, such as the Internet, a local area network, a wide area network, and/or a wireless network. The network can include copper transmission cables, fiber optic transmission, wireless transmission, routers, firewalls, switches, gateway computers, and/or edge servers. A network adapter card or network interface in each computing/processing device can receive the computer-readable program instructions from the network and forward the computer-readable program instructions to be stored on the computer-readable storage medium in the computing/processing device.

The computer program instructions for performing operations of the present disclosure can include assembly instructions, instruction set architecture (ISA) instructions, machine instructions, machine-related instructions, microcode, firmware instructions, state setting data, or source codes or object codes written in any combination of one or more programming languages. The programming language can include object-oriented programming languages, such as Smalltalk, C++, etc., and conventional procedural programming languages, such as the "C" language or similar programming languages. The computer-readable program instructions can be executed entirely on the user computer, partially on the user computer, as a stand-alone software package, partially on the user computer and partially on a remote computer, or entirely on the remote computer or server. When the remote computers are involved, the remote computers can be connected to the user computer through any type of networks, including a local area network (LAN) or a wide area network (WAN), or to an external computer (such as an Internet service provider being connected through the Internet). In some embodiments, an electronic circuit can be customized by using state information of the computer-readable program instructions, such as a programmable logic circuit, a field programmable gate array (FPGA), or a programmable logic array (PLA). The electronic circuit can execute the computer-readable program instructions to implement various aspects of the present disclosure.

Aspects of the present disclosure are described according to flowcharts and/or block diagrams of the methods, apparatuses (systems), and computer program products of embodiments of the present disclosure. Each block of the flowchart and/or block diagrams and a combination of blocks in the flowcharts and/or block diagrams can be implemented by the computer-readable program instructions.

These computer-readable program instructions can be provided to a processing unit of a general-purpose computer, a special-purpose computer, or other programmable data processing apparatus to produce a machine. Thus, the instructions, when executed by the processing unit of the computer or other programmable data processing apparatuses, cause an apparatus to implement the function/action defined in one or more blocks in the flowcharts and/or blocks. These computer-readable program instructions can also be stored in the computer-readable medium. Thus, the computer-readable medium storing the instructions can include a product, which includes the instructions for implementing the functions/actions defined in the one or more blocks of the flowcharts and/or block diagrams.

The computer-readable program instructions can also be loaded onto a computer, other programmable data processing apparatuses, or other devices to cause a series of operating steps to be performed on the computer, other programmable data processing apparatuses, or other devices to produce a computer-implemented process. Thus, the instructions executed on the computer, other programmable data processing apparatuses, or other devices can implement the functions/actions specified in one or more blocks in the flowcharts and/or block diagrams.

The flowcharts and block diagrams illustrate the systems, the methods, and the system architecture, function, and operation that can be implemented in the computer program product according to embodiments of the present disclosure. Each block in the flowcharts and/or block diagrams can represent a part of a module, a program segment, or an instruction. The part of the module, the program segment, and the instruction can include one or more executable instructions for implementing the specified logical functions. In some embodiments, the functions marked in the blocks can happen in an order different from the marked sequence in the accompanying drawings. For example, two continuous blocks can be performed in parallel and in an inverse order, which is determined according to the involved function. Each block and a combination of the blocks in the flowcharts and/or block diagrams can be implemented by the special-purpose system for performing the determined function or action based on hardware or a combination of the special-purpose hardware and the computer instructions.

Embodiments of the present disclosure are described above. The above description is illustrative, not exhaustive, and is not limited to the embodiments of the present disclosure. Various modifications and variations can be apparent to those skilled in the art without departing from the scope and spirit of embodiments of the present disclosure. The terminology used herein is chosen to best explain the principles of embodiments, practical applications, or technical improvements to the technology in the market, or to enable those of ordinary skill in the art to understand embodiments of the present disclosure.

What is claimed is:

1. A vehicle positioning method comprising:
   determining a first relative horizontal distance between an onboard device and a roadside device at a first moment, a second relative horizontal distance at a second moment, and a third relative horizontal distance at a third moment, the first moment being earlier than the second moment, and the second moment being earlier than the third moment;
   obtaining position information of the roadside device;
   determining a first moving distance of a vehicle where the onboard device is located from the first moment to the second moment and a second moving distance of the vehicle from the second moment to the third moment; and
   based on the first moving distance and the second moving distance, determining a moving trajectory of the vehicle partially overlapping with three circles with the position information of the roadside device as a center and with the first relative horizontal distance, the second relative horizontal distance, and the third relative horizontal distance as radii, wherein the determining the moving trajectory of the vehicle comprises selecting the moving trajectory from a plurality of candidate moving trajectories according to at least one of a moving direction of the vehicle between the first moment and the third moment or a lane direction.

2. The method of claim 1, wherein determining the first relative horizontal distance between the onboard device and the roadside device at the first moment includes:
   determining a first relative distance between the onboard device and the roadside device at the first moment;
   obtaining an installation height of the onboard device and an installation height of the roadside device;
   determining a relative vertical distance between the roadside device and the onboard device based on the installation height of the onboard device and the installation height of the roadside device; and
   determining the first relative horizontal distance based on the first relative distance and the relative vertical distance.

3. The method of claim 1, wherein determining the moving trajectory of the vehicle partially overlapping with the three circles with the position information of the roadside device as the center and with the first relative horizontal distance, the second relative horizontal distance, and the third relative horizontal distance as the radii includes:
   based on the first moving distance and the second moving distance, determining a third moving distance from the first moment to the third moment;
   determining four moving trajectories, each moving trajectory of the four moving trajectories including a first point on a first circle with the position information of the roadside device as the center and the first relative horizontal distance as a radius, a second point on a second circle with the position information of the roadside device as the center and the second relative horizontal distance as a radius, and a third point on a third circle with the position information of the roadside device as the center and the third relative horizontal distance as a radius, the first point having the first moving distance to the second point, the second point having the second moving distance to the third point, and the first point having the third moving distance to the third point;
   obtaining the moving direction of the vehicle between the first moment and the third moment or map lane information within a predetermined range with the position information as a center, the map lane information indicating a lane area and the lane direction; and
   determining the moving trajectory matching the moving direction or the map lane information from the four moving trajectories.

4. The method of claim 3, wherein determining the third moving distance from the first moment to the third moment includes:
obtaining a turning angle of the vehicle at the second moment; and
determining the third moving distance from the first moment to the third moment based on the turning angle, the first moving distance, and the second moving distance.

5. The method of claim 1, wherein in response to performing the method at the onboard device, obtaining the position information of the roadside device includes receiving the position information of the roadside device from the roadside device.

6. The method of claim 1, wherein in response to performing the method at the roadside device, determining the moving direction of the vehicle between the first moment and the third moment, the first moving distance of the vehicle from the first moment to the second moment, and the second moving distance of the vehicle from the second moment to the third moment includes:
receiving the moving direction, the first moving distance, and the second moving distance from the onboard device.

7. The method of claim 6, further comprising:
sending the moving trajectory of the vehicle to the onboard device.

8. An onboard device comprising:
at least one processor; and
a memory communicatively connected to the at least one processor and storing an instruction that, when executed by the at least one processor, causes the at least one processor to:
determine a first relative horizontal distance between an onboard device and a roadside device at a first moment, a second relative horizontal distance at a second moment, and a third relative horizontal distance at a third moment, the first moment being earlier than the second moment, and the second moment being earlier than the third moment;
obtain position information of the roadside device;
determine a first moving distance of a vehicle where the onboard device is located from the first moment to the second moment and a second moving distance of the vehicle from the second moment to the third moment; and
based on the first moving distance and the second moving distance, determine a moving trajectory of the vehicle partially overlapping with three circles with the position information of the roadside device as a center and with the first relative horizontal distance, the second relative horizontal distance, and the third relative horizontal distance as radii, wherein the determining the moving trajectory of the vehicle comprises selecting the moving trajectory from a plurality of candidate moving trajectories according to at least one of a moving direction of the vehicle between the first moment and the third moment or a lane direction.

9. The onboard device of claim 8, wherein the at least one processor is further configured to:
determine a first relative distance between the onboard device and the roadside device at the first moment;
obtain an installation height of the onboard device and an installation height of the roadside device;
determine a relative vertical distance between the roadside device and the onboard device based on the installation height of the onboard device and the installation height of the roadside device; and
determine the first relative horizontal distance based on the first relative distance and the relative vertical distance.

10. The onboard device of claim 8, wherein the at least one processor is further configured to:
based on the first moving distance and the second moving distance, determine a third moving distance from the first moment to the third moment;
determine four moving trajectories, each moving trajectory of the four moving trajectories including a first point on a first circle with the position information of the roadside device as the center and the first relative horizontal distance as a radius, a second point on a second circle with the position information of the roadside device as the center and the second relative horizontal distance as a radius, and a third point on a third circle with the position information of the roadside device as the center and the third relative horizontal distance as a radius, the first point having the first moving distance to the second point, the second point having the second moving distance to the third point, and the first point having the third moving distance to the third point;
obtain the moving direction of the vehicle between the first moment and the third moment or map lane information within a predetermined range with the position information as a center, the map lane information indicating a lane area and the lane direction; and
determine the moving trajectory matching the moving direction or the map lane information from the four moving trajectories.

11. The onboard device of claim 10, wherein the at least one processor is further configured to:
obtain a turning angle of the vehicle at the second moment; and
determine the third moving distance from the first moment to the third moment based on the turning angle, the first moving distance, and the second moving distance.

12. The onboard device of claim 10, wherein the onboard device obtains a global navigation satellite system (GNSS) signal of the vehicle where the onboard device is located between the first moment and the third moment to determine the moving direction of the vehicle between the first moment and the third moment.

13. The onboard device of claim 10, wherein the onboard device obtains direction sensor information or angular speed sensor information of the vehicle between the first moment and the third moment to determine the moving direction of the vehicle between the first moment and the third moment.

14. The onboard device of claim 8, wherein the at least one processor is further configured to receive the position information of the roadside device from the roadside device.

15. A roadside device comprising:
at least one processor; and
a memory communicatively connected to the at least one processor and storing an instruction that, when executed by the at least one processor, causes the at least one processor to:
determine a first relative horizontal distance between an onboard device and a roadside device at a first moment, a second relative horizontal distance at a second moment, and a third relative horizontal distance at a third moment, the first moment being earlier than the second moment, and the second moment being earlier than the third moment;

obtain position information of the roadside device;

determine a first moving distance of a vehicle where the onboard device is located from the first moment to the second moment and a second moving distance of the vehicle from the second moment to the third moment; and based on the first moving distance and the second moving distance, determine a moving trajectory of the vehicle partially overlapping with three circles with the position information of the roadside device as a center and with the first relative horizontal distance, the second relative horizontal distance, and the third relative horizontal distance as radii, wherein the determining the moving trajectory of the vehicle comprises selecting the moving trajectory from a plurality of candidate moving trajectories according to at least one of a moving direction of the vehicle between the first moment and the third moment or a lane direction.

16. The roadside device of claim 15, wherein the at least one processor is further configured to:

determine a first relative distance between the onboard device and the roadside device at the first moment;

obtain an installation height of the onboard device and an installation height of the roadside device;

determine a relative vertical distance between the roadside device and the onboard device based on the installation height of the onboard device and the installation height of the roadside device; and determine the first relative horizontal distance based on the first relative distance and the relative vertical distance.

17. The roadside device of claim 15, wherein the at least one processor is further configured to:

based on the first moving distance and the second moving distance, determine a third moving distance from the first moment to the third moment;

determine four moving trajectories, each moving trajectory of the four moving trajectories including a first point on a first circle with the position information of the roadside device as the center and the first relative horizontal distance as a radius, a second point on a second circle with the position information of the roadside device as the center and the second relative horizontal distance as a radius, and a third point on a third circle with the position information of the roadside device as the center and the third relative horizontal distance as a radius, the first point having the first moving distance to the second point, the second point having the second moving distance to the third point, and the first point having the third moving distance to the third point;

obtain the moving direction of the vehicle between the first moment and the third moment or map lane information within a predetermined range with the position information as a center, the map lane information indicating a lane area and the lane direction; and determine the moving trajectory matching the moving direction or the map lane information from the four moving trajectories.

18. The roadside device of claim 17, wherein the at least one processor is further configured to:

obtain a turning angle of the vehicle at the second moment; and determine the third moving distance from the first moment to the third moment based on the turning angle, the first moving distance, and the second moving distance.

19. The roadside device of claim 15, wherein the at least one processor is further configured to:

receive the moving direction, the first moving distance, and the second moving distance from the onboard device.

20. The roadside device of claim 19, wherein the at least one processor is further configured to:

send the moving trajectory of the vehicle to the onboard device.

* * * * *